(No Model.) 4 Sheets—Sheet 1.

A. HODGSON.
COMBINED COUPLING AND BRAKE.

No. 378,315. Patented Feb. 21, 1888.

WITNESSES:

INVENTOR
Alexander Hodgson
BY C. Henry Storey
ATTORNEY (No Model.) 4 Sheets—Sheet 2.
A. HODGSON.
COMBINED COUPLING AND BRAKE.
No. 378,315. Patented Feb. 21, 1888.
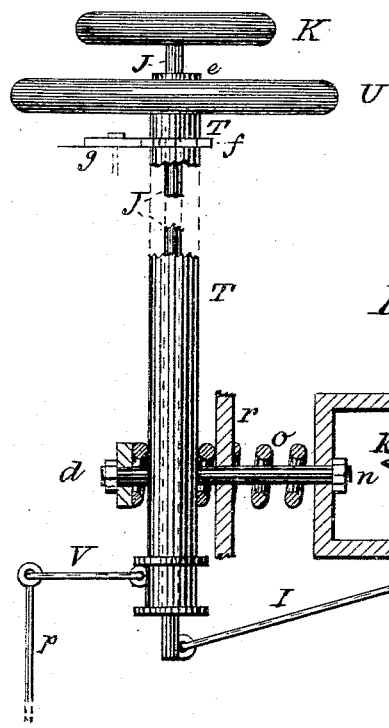
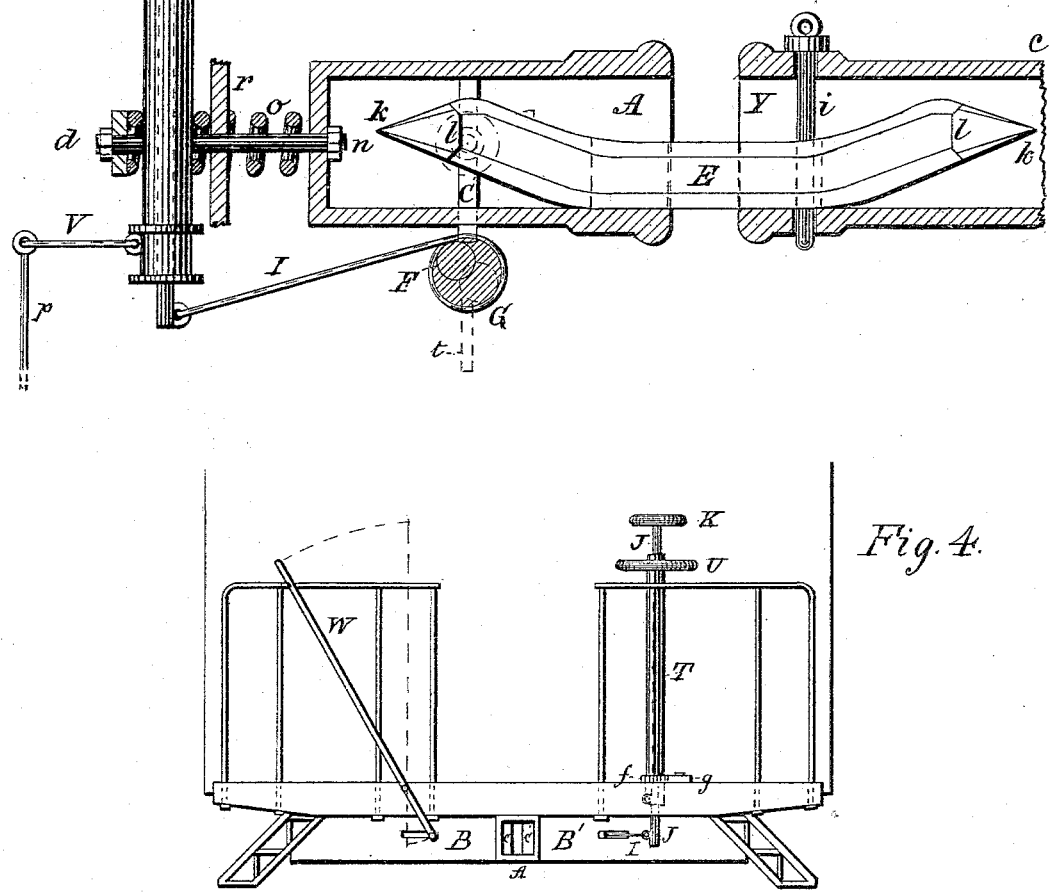
WITNESSES:
INVENTOR
Alexander Hodgson,
BY C. Henry Froney
ATTORNEY (No Model.) 4 Sheets—Sheet 3.

A. HODGSON.
COMBINED COUPLING AND BRAKE.

No. 378,315. Patented Feb. 21, 1888.

WITNESSES:

INVENTOR
Alexander Hodgson
BY
C. Henry Roney
ATTORNEY (No Model.) 4 Sheets—Sheet 4.

A. HODGSON.
COMBINED COUPLING AND BRAKE.

No. 378,315. Patented Feb. 21, 1888.

WITNESSES:
Edwin Agnew
A. Bechtel

INVENTOR
Alexander Hodgson
BY C. Henry Storey
ATTORNEY

UNITED STATES PATENT OFFICE.

ALEXANDER HODGSON, OF COCHRANVILLE, PENNSYLVANIA.

COMBINED COUPLING AND BRAKE.

SPECIFICATION forming part of Letters Patent No. 378,315, dated February 21, 1888.

Application filed June 13, 1887. Serial No. 241,230. (No model.)

*To all whom it may concern:*

Be it known that I, ALEXANDER HODGSON, a citizen of the United States, residing at Cochranville, in the county of Chester and State of Pennsylvania, have invented certain new and useful Improvements in Safety Car Couplings and Brakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1:
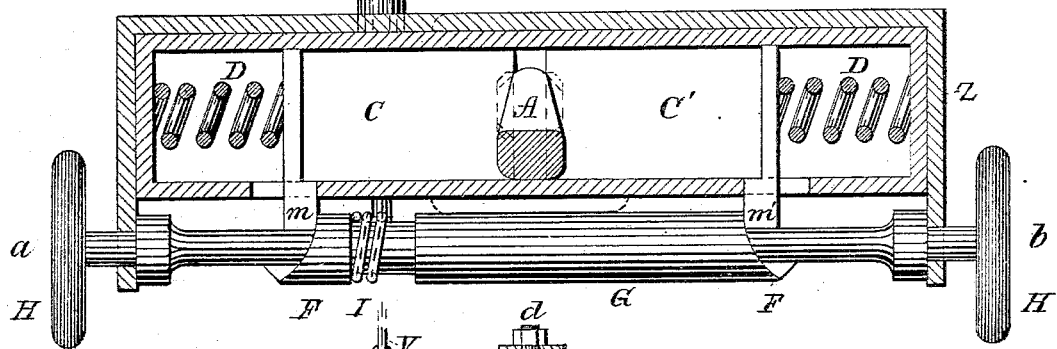
Figure 2:
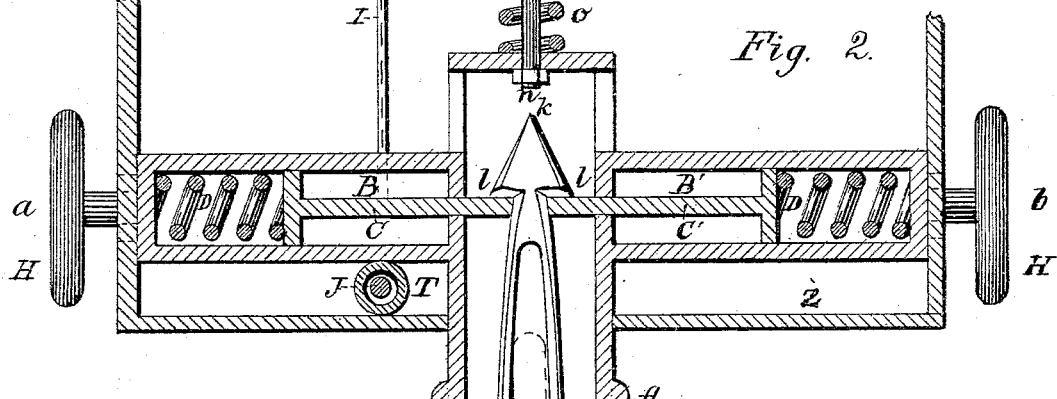
Figure 5:
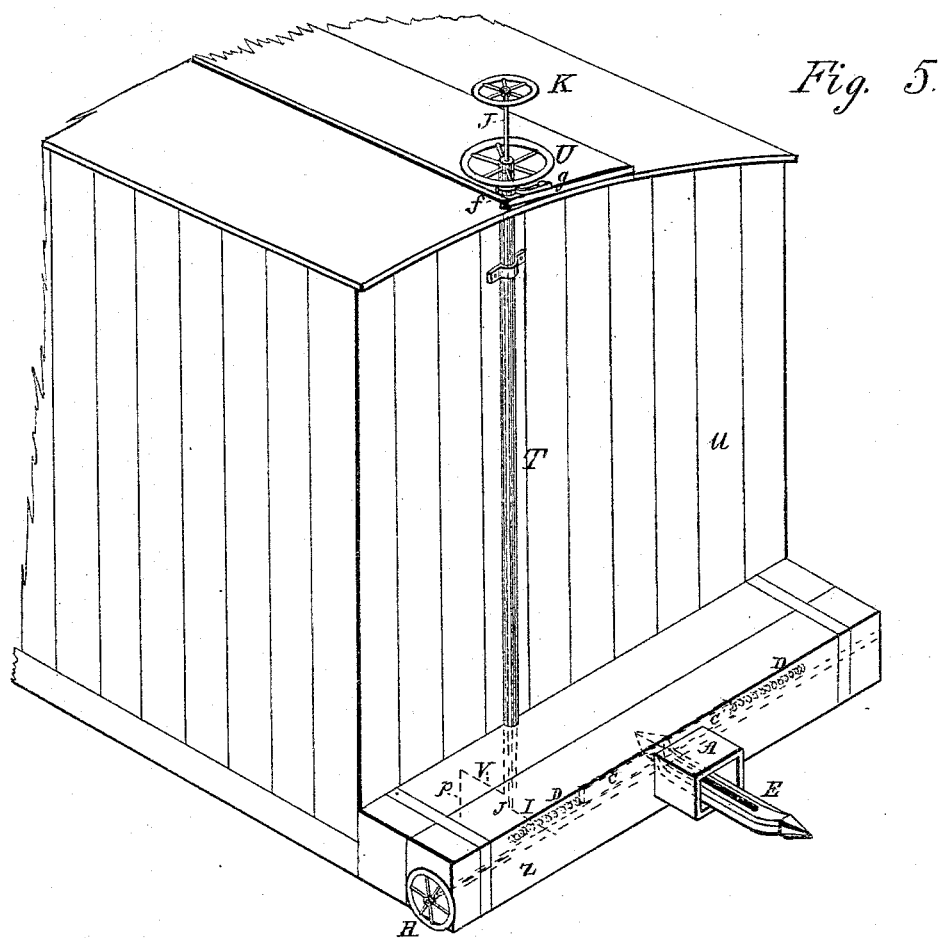
Figure 6:
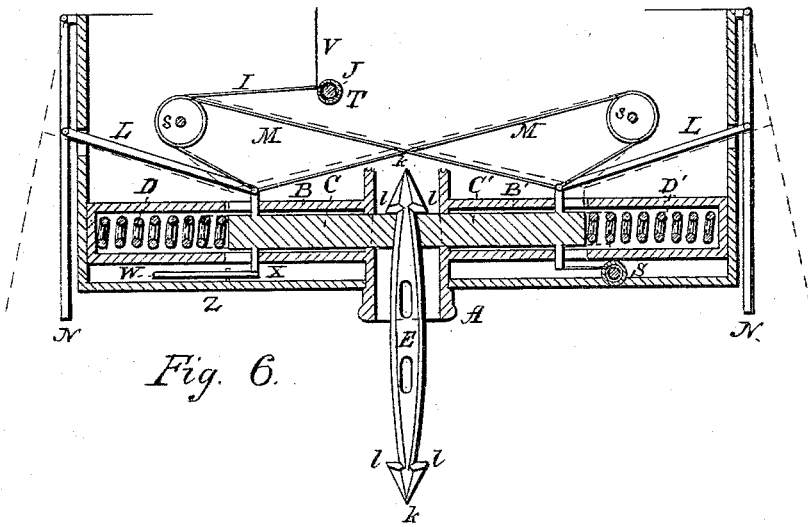
Figure 7:
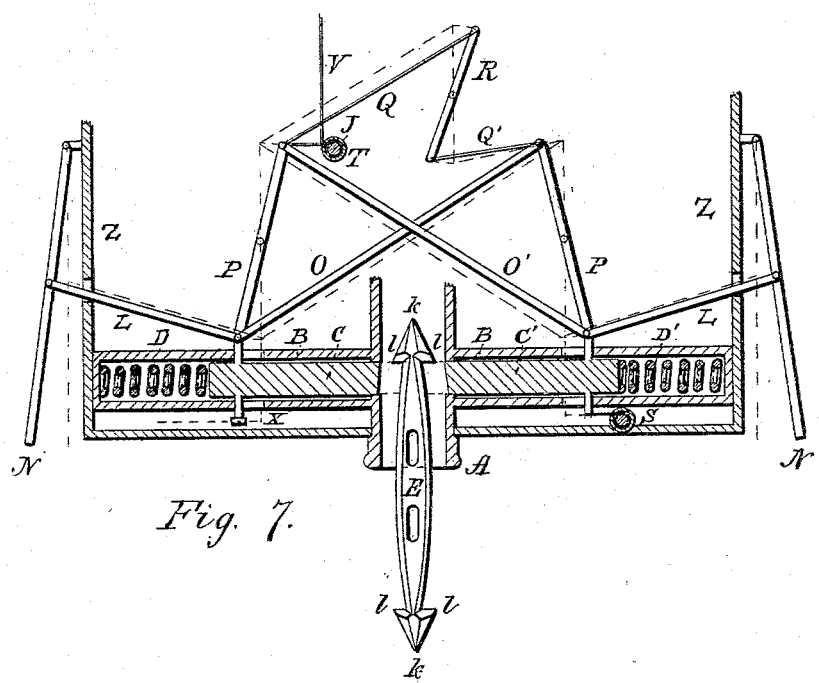

Figure 1 is a transverse vertical sectional view of my improved coupling and brake through $a\ b$ of Fig. 2. Fig. 2 is a horizontal sectional view of Fig. 1. Fig. 3 is a longitudinal vertical sectional view of my improved coupling and brake through $c\ d$ of Fig. 2, showing it also coupled to an ordinary link-and-pin draw-head. Fig. 4 is an end view of platform and railing of a passenger-car fitted with my improved coupling and brake. Fig. 5 is an isometrical view of one end of a freight-car fitted with my improved coupling and brake. Fig. 6 is a horizontal sectional view of my improved coupling and brake operated by means of levers and chains. Fig. 7 is also a horizontal sectional view of my improved coupling and brake operated by different arrangements of levers and chains from those shown in Fig. 6.

Similar letters of reference indicate corresponding parts in all the figures.

Many accidents occur to train-men in coupling and uncoupling cars with the ordinary link-coupling, and to passengers in case a car of a train is derailed without being detached from the rest of the train.

One of the objects of my invention is to substitute a safe mode of coupling and uncoupling cars, and also a means by which a derailed car fitted with my improved coupling will automatically detach itself from the rest of the train as soon as it leans at a sufficient angle to turn the improved link used by me, so that it will be detached from the jaws of my coupling; also, a car fitted with my improved coupling may be coupled to any car fitted with an ordinary link-coupling, using my link in place of the link usually used, as shown in Fig. 3.

By means of my invention one man may couple or uncouple the cars and set the brakes at the same time from the roof or platform of cars fitted with my improved coupling and brake.

In my invention the draw-bar or head A is fitted with the guides B B', containing the sliding jaws C C' and springs D D D, together with the safety coupling-link E, the movable jaws C C' being operated by cams F F' on a rock-shaft, G, Figs. 1, 2, and 5, and the hand wheels or levers H H', or chain I, rod J, and hand-wheel K, or by means of the rods L L, chains M M, roller S S, hand-levers N N, Fig. 6, and may also be connected by a chain, I, with the rod J, extending to the top of the car, as in Fig. 5.

Another mode of operating the movable jaws C C' is shown in Fig. 7, where they are moved either by the rods O O' L L, levers P P, and hand-levers N N, together with the chain I and rod J, extending to the top of the car, as in Fig. 7; or the rods O O' may be omitted and rods Q Q and lever R substituted. The chain I, rod J, and hand-wheel K may also be placed at S or other convenient point, and the chain I attached to it and one of the movable jaws C C'. The rod or shaft J is placed within my hollow brake-shaft T, and extending above and below it, so that the hand-wheel K of my coupling-rod J will be above the hand-wheel U of my hollow brake-shaft T. My coupling-shaft J is supported by a pin or collar, $e$, resting on the hollow brake-shaft T. My hollow brake-shaft T is fitted with a ratchet-wheel, $f$, and pawl $g$, by means of which the hollow brake-shaft T may be set in any desired position, the hollow shaft T being connected by a chain, V, to the ordinary brake-rods, $p$, of the car as usually constructed.

Where it is not desired to use the brake in connection with my coupler, a lever, W, and chain X, connected with one of the movable jaws C C', may be used, as shown in Fig. 4, where, the jaws being closed, the lever W is inclined, tending by its weight to aid in keeping them in that position. By raising it to the vertical position shown by the dotted lines at $h$ the jaws will be opened and the barbed link released, as shown in Fig. 7.

The springs D D D D D D D are for the purpose of pressing the jaws C C' toward each other, except where moved away from each other by the hand-wheels, chains, levers, rods, or cams, as shown. The hand-wheels H H' may be weighted on the side that will be lowest when the sliding jaws are closed and the cams are in the position shown in Fig. 1, to aid in keeping the jaws closed. Levers $t$ may be substituted for the hand-wheels H H'.

The safety coupling-link E may be straight or bent and have one opening for a pin in case it is desired to couple to a car arranged for the ordinary link-and-pin coupling, as shown in Figs. 2 and 3, or as in Figs. 6 and 7, where the barbed link E has two openings. Fig. 3 shows my coupling and link E coupled to an ordinary pin-and-link draw-head, Y, the ordinary pin, $i$, being used in the draw-head Y.

The operation of my improved coupling and brake is as follows: The sliding jaws C C' being pushed close together by the springs D D, one of my improved safety coupling-links E is placed in a draw-head, as at Y, Fig. 4, of an ordinary link-and-pin coupling or of a car fitted with this improvement, then backed up to one of my improved couplings, as in Fig. 3, when the point $k$ of the barb will force its way between the jaws C C', which will close behind its barbs $l\,l$, thus forming the coupling. When desired to uncouple it from the side, the hand-wheels H H' are revolved half-way round, the cams F F on the rock-shaft G forcing back the pins $m\,m$, and the sliding jaws C C' releasing the barbed point of the barbed link E and allowing it to be withdrawn by drawing the cars apart. When desired to uncouple the cars from the roof or platform, the hand-wheel K may be turned, winding up the chain I on the rod J, thus turning the rock-shaft G, and the cams F F' similarly forcing back the pins $m\,m$ and the sliding jaws C C' and releasing the safety coupling-link E. In the case of the lever-rod and chain-connections shown in Figs. 6 and 7 the cars can be coupled and uncoupled from the side by moving the hand-levers N N'.

The brakes can be put on or off at the same time from the platform or roof of the car by means of the hand-wheel U, hollow brake-shaft T, and chain V, connected to the ordinary brake-rods, $p$, of the car.

The springs D D D, &c., may be of metal, rubber, or other suitable elastic material.

My draw-head, guides, sliding jaws, springs, and rock-shaft, or rods, levers, and chains, may be placed in a frame, Z, which may be bolted or otherwise fastened to the end or platform of a car, $u$, (after removing its draw-head,) so that old cars may be provided with my improved coupler and brake with very little expense.

My improved draw-head may be connected to the frame $r$, of a car by the ordinary bolt, $n$, and spring $o$, as shown in Figs. 2 and 3.

My improved safety coupling-link E is only barbed at the sides $l\,l$, and is of greater height than width back of the barbs $l\,l$, so that when partially revolved, as by a car being derailed, the sliding jaws C C' will be forced open and the link released.

In Figs. 4 and 6 the solid lines show the positions of the parts of my improvement when the sliding jaws C C' are closed and the coupling made. In the same figures the dotted lines show the relative positions of the same parts when the sliding jaws are open and the barbed link E released.

In Fig. 7 the solid lines show the position of this modification of my improvement with the sliding jaws C C' open and my safety coupling-link E released, the dotted lines in the same figure showing the relative position of the parts when the sliding jaws C C' are closed and the coupling made.

Having thus described my invention, what I claim, and desire to secure by Letters Patent, is—

1. In a car coupling and brake, the combination consisting of the safety coupling-link E, adapted to fit into a draw-head, A, having guides B B', provided with sliding jaws C C', which are operated by the springs D D, cams F F, and rock-shaft G, arranged as shown, and connected with the weighted hand wheels or levers H H and chain I, hand-wheel K, and rod J in the hollow brake-shaft T, also having the brake hand-wheel U, as described and shown, and for the purpose set forth.

2. In a car coupling and brake, the combination consisting of the safety coupling-link E, adapted to fit into a draw-head, A, having guides B B', provided with sliding jaws C C', which are operated by the springs D D, rods L O P, or chains M Q, levers N N W, chain I, hand-wheel K, and rod J, also having the brake hand-wheel U, all connected as shown, and for the purpose described.

3. The safety coupling-link E, formed as shown, and having the vertical height back of the barbs $l\,l$ greater than the transverse width at the same point, the barbed point $k\,l\,l$ having the form of a four-sided pyramid with beveled angles, so that when the link is partially turned about forty-five degrees on its axis by derailment of the car or other accident the sliding jaws C C' will be forced apart, the link released, and the cars uncoupled, substantially as set forth.

4. The hollow brake-shaft T, containing the coupling-rod J, as shown and described.

In testimony whereof I affix my signature in presence of two witnesses.

ALEXANDER HODGSON. [L. S.]

Witnesses:
 WM. A. RUSSELL,
 J. A. LARGE.